Oct. 9, 1962 G. F. QUAYLE 3,057,429
VEHICLE STEERING SYSTEM
Filed Dec. 7, 1959 3 Sheets-Sheet 1
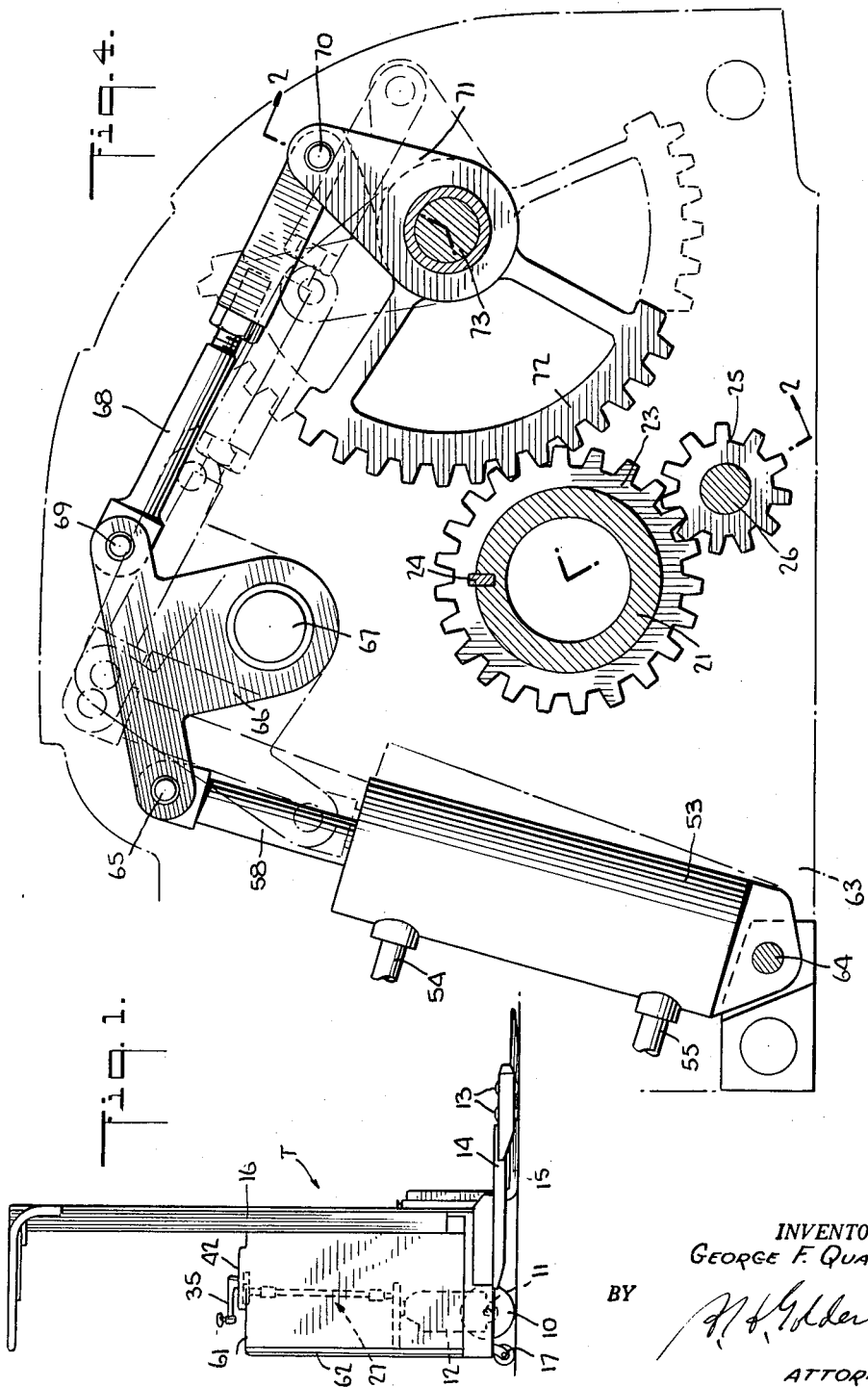
INVENTOR.
GEORGE F. QUAYLE
BY
ATTORNEY

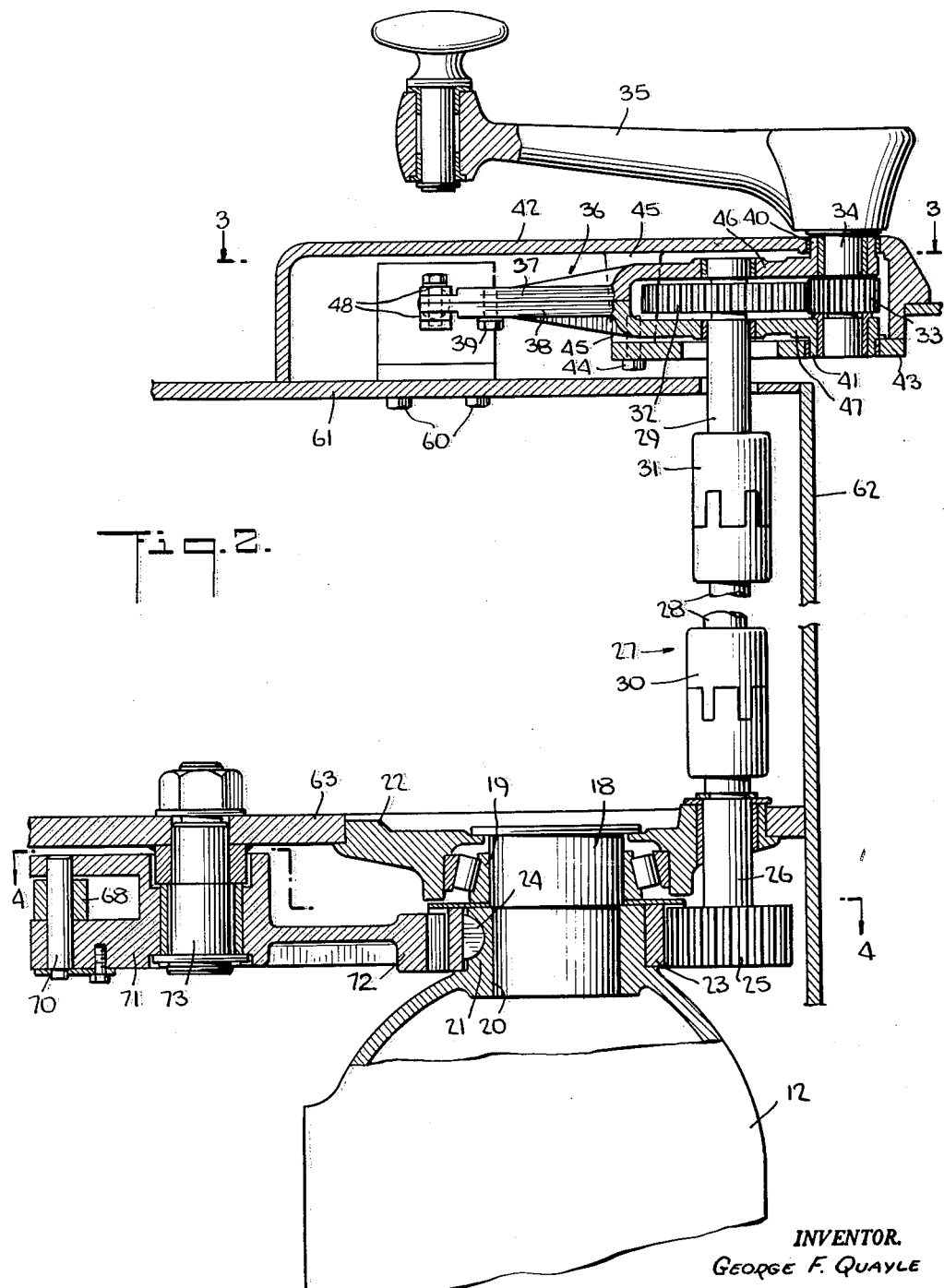

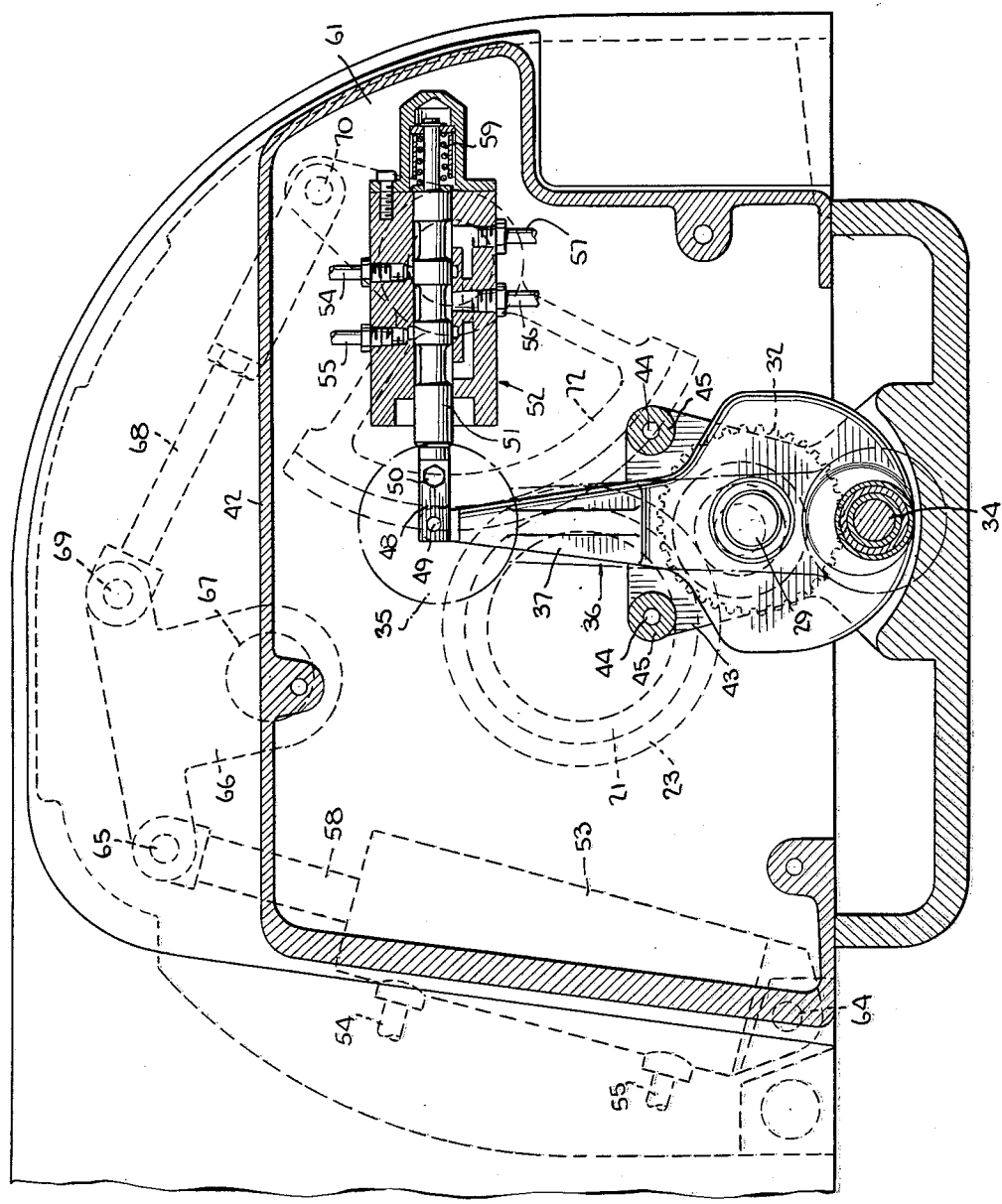

3,057,429
VEHICLE STEERING SYSTEM
George F. Quayle, Philadelphia, Pa., assignor to The Yale and Towne Manufacturing Company, Stamford, Conn., a corporation of Connecticut
Filed Dec. 7, 1959, Ser. No. 857,703
5 Claims. (Cl. 180—79.2)

This invention relates to a vehicle steering system, and in particularly to a vehicle steering system incorporating power steering.

The present invention provides a relatively simple, comparatively inexpensive steering system, which may be used advantageously in new vehicles and also in converting manual steering systems of existing vehicles to power steering. The system of the invention not only provides for power steering, but also provides for manual steering in the event of failure of the power steering.

The steering system of the invention includes a rotatable steering shaft which is operatively connected to the wheel or wheels to be steered and may be manually rotated to effect steering of the vehicle in the conventional manner. However, unlike conventional systems in which the steering shafts are mounted only for rotary movement, the steering shaft of the present invention is mounted for slight movement bodily, as well as for rotary movement. Therefore, when steering torque is applied to the steering shaft to effect normal steering rotation of the shaft, the steering shaft will first move bodily because of the manner in which it is mounted. In accordance with the present invention, this slight bodily movement of the steering shaft relatively to its normal rotary movement is utilized to actuate a suitable control element to start operation of a power steering motor to turn the wheel in the desired direction. The power steering motor may be either a hydraulic motor or an electric motor. The power steering motor continues to turn the wheels until the torque applied to the steering shaft is relieved and the tendency of the steering shaft to move bodily as well as to rotate is terminated. Thus, in this manner, power steering is controlled by the application of relatively low torque to the steering shaft. Should the power steering system fail, the vehicle may still be steered by manually applying sufficient torque to rotate the steering shaft to effect steering in the conventional manner.

The invention having been broadly described, a more detailed description of one embodiment of the invention is given hereafter by reference to the accompanying drawings wherein:

FIG. 1 is a side elevational view of a lift truck incorporating the steering system of the present invention;

FIG. 2 is an enlarged sectional view of the steering system of the truck shown in FIG. 1;

FIG. 3 is a sectional view taken on the line 3—3 of FIG. 2; and,

FIG. 4 is a sectional view taken on the line 4—4 of FIG. 2.

Referring to the drawings and in particular to FIG. 1, the invention is shown applied to a conventional straddle type lift truck, generally designated by the reference letter T. While the invention is described hereafter in conjunction with such a truck, it will be appreciated that the invention is also applicable to other types and styles of vehicles.

The truck T is driven and steered by a ground wheel 10 which is carried on an axle 11 secured to a rotatively mounted, combined motor and wheel support 12. The forward end of the truck is supported on wheels 13 by a pair of straddle arms 14. While only one of the straddle arms 14 can be seen in the drawing, it will be appreciated that the other straddle arm 14 is positioned on the other side of the truck so that lift forks 15 may be moved down against the ground between the straddle arms 14. The forks 15 are adapted to be elevated on a mast structure 16 in the conventional manner. A caster wheel 17 mounted at the rear of the truck and spaced laterally from the steerable ground wheel 10 provides the truck with additional stability.

Referring to FIG. 2, the wheel support 12 is mounted for steering rotation relatively to the truck by a king pin 18 which extends through the inner race of a thrust bearing 19 and through an opening 20 in an annular projection 21 provided at the top of the wheel support 12. The thrust bearing 19 is carried by a truck frame member 22 and accepts the thrust between the wheel support 12 and the truck frame while permitting rotation of the wheel support 12.

A gear 23 is carried on the annular projection 21 of the wheel support 12, and is keyed thereto by a key 24. The gear 23 meshes with a pinion 25 secured to the lower end of a stub shaft 26. The stub shaft 26 forms the lower portion of a steering shaft, generally designated by the reference numeral 27. Steering shaft 27 includes, in addition to the stub shaft 26, an intermediate shaft 28, and a stub shaft 29. Stub shaft 26 is secured to the lower end of the intermediate shaft 28 by a universal joint 30 and stub shaft 29 is secured to the upper end of the intermediate shaft 27 by a universal joint 31. Stub shaft 26 is suitably journalled in an opening through the frame member 22. The provision of the universal joints 30 and 31 allow for misalignment of the stub shafts 26 and 29. A gear 32 is secured to the stub shaft 29 and meshes with a pinion 33 which is secured to a shaft 34. A handle or steering wheel 35 is secured to the upper end of the shaft 34 so that by manually turning the steering wheel 35, the wheel support 12 may be rotated through the gear and shaft arrangement described to effect steering movement of the wheel 10.

It will be appreciated that the steering system as so far described is of generally conventional construction. However, unlike conventional steering systems, in which the steering shafts are mounted only for rotary movement, the upper end of the steering shaft 27 formed by the stub shaft 29, is mounted for slight bodily movement in a lateral direction, as will be described in detail hereafter. Thus, when steering torque is applied to the stub shaft 29 by turning of the steering wheel 35, the stub shaft 29 will first move bodily in a lateral direction. In accordance with the invention, this bodily movement is utilized to actuate a control element to start operation of a power steering motor to turn the wheel support 12 so as to effect steering movement of the wheel 10 in the desired direction. The power steering motor continues to turn the wheel support 12 until the torque applied to the steering shaft is relieved and the tendency of the steering shaft to move bodily, as well as to rotate, is terminated. Thus, the power steering is controlled by the application of relatively low torque to the steering shaft by turning the steering wheel 35. Should the power steering fail, the vehicle may still be steered by manually applying sufficient torque to the steering shaft through the steering wheel 35 to turn the wheel support 12.

Referring to FIGS. 2 and 3, lateral movement of the upper end of the steering shaft 27 formed by the stub shaft 29 is provided for by journalling the stub shaft 29 in a bifurcated arm member 36 which is mounted for pivotal movement in a horizontal plane around the axis of the shaft 34. Arm member 36 is conveniently formed in two parts, 37 and 38, secured together by a bolt 39, and is mounted for pivotal movement by means of integral hub portions 40 and 41 which are suitably journalled respectively in an opening provided in a top cover 42 and in an opening provided in a plate 43. Thus, the stub shaft 29 and the arm member 36 may more laterally by horizontal pivotal movement of the arm member 36 about the axis of the shaft 34. This lateral movement of stub shaft 29 is facilitated by the provision of the universal joints 30 and 31. Plate 43 is secured by means of bolts 44 to posts 45 formed integrally with the top cover 42.

The shaft 34 is suitably journalled in openings through the hub portions 40 and 41 of the arm member 36 so that the shaft 34 and pinion 33 may be rotated by the steering wheel 35 relatively to the arm member 36. Pinion 33 and gear 32 extend into the space between bifurcations 46 and 47 of the arm member 36. Because the arm member 36 and the shaft 34 rotate about the same axis, the gear 32 and the pinion 33 remain in proper mesh during the pivotal movement of the arm member 36.

It will be appreciated that when the steering wheel 35 is turned, a torque of unbalanced force will be applied to the stub shaft 29 tending to rotate the shaft 29 and also to move the shaft 29 in a lateral direction. Because the shaft 29 is free to move in a lateral direction, it will first move in this direction when torque is applied, and will pivot the arm member 36 in the same direction. As best shown in FIG. 3, the end of the arm member 36 is pivotally connected by a connecting link 48, pivot pin 49, and bolt 50 to the slide 51 of a valve 52 so that movement of the arm member 36 and the stub shaft 29 results in movement of the slide 51 of the valve 52 to control the flow of fluid under pressure to a fluid actuated steering motor 53.

The valve 52 is connected to one side of the fluid motor 53 by means of a conduit 54 and is connected to the other side of the fluid motor 53 by a conduit 55. Movement of the slide 51 of the valve 52 in one direction serves to connect conduit 54 with a conduit 56 from a source of fluid under pressure (not shown) and to connect conduit 55 with a conduit 57 from a reservoir (not shown) so that the piston rod 58 of the motor 53 is retracted. When the slide 51 is moved in the opposite direction, the flow of fluid to the motor 53 is reversed and the piston rod 58 is extended. When the slide 51 is centered, there is no flow of fluid to or from the motor 53. The direction the slide 51 is moved, of course, depends on the direction of the torque applied to the stub shaft 29. The valve 52 includes a conventional centering spring 59 for returning the slide to centered position. As best shown in FIG. 2, the valve is secured by means of bolts 60 to a horizontal frame member 61 forming a part of truck body 62.

Referring to FIG. 4, the steering motor 53 is pivotally attached at one end to a horizontal frame member 63 by a pin 64. The free end of the piston rod 58 is pivotally attached by means of a pin 65 to one arm of a bell crank member 66. The crank member 66 is pivotally attached to the frame member 63 by a pin 67. An adjustable link 68 is pivotally connected at one end by means of a pin 69 to the other arm of the crank member 66 and is pivotally connected at its other end by means of a pin 70 to an integral lever arm 71 of a gear segment 72. As best shown in FIG. 2, the gear segment 72 is pivotally attached to horizontal frame member 63 by means of a pivot pin 73. The gear segment 72 meshes with gear 23 which is keyed to wheel support 12. Thus, extension and retraction of the piston rod 58 of the motor 53 in response to operation of the valve 52 by lateral movement of the stub shaft 29, serves to rotate the wheel support 12 to effect steering movement of the wheel 10. The motor 53 continues to rotate the wheel support 12 until the torque applied to the stub shaft 29 is relieved and the tendency thereof to move laterally, as well as to rotate, is therefore terminated so that the slide 51 of the valve 52 returns to centered position. Thus, in this manner, power steering is controlled by the application of relatively low torque to the stub shaft 29 by turning the steering wheel 35. Should the steering motor 53 fail to operate, the truck may still be steered by turning the steering wheel 35 with sufficient force to rotate the wheel support 12, through the drive formed by shaft 34, pinion 33, gear 32, stub shaft 29, intermediate shaft 28, stub shaft 26, pinion 25 and gear 23.

From the preceding description, it can be seen that there is provided a relatively simple, comparatively inexpensive steering system which not only provides for power steering, but also provides for manual steering in the event of failure of the power steering. The steering system may be used advantageously in new vehicles, and also may be used in converting manual steering systems of existing vehicles to power steering, inasmuch as the system incorporates many parts of a conventional manual steering system.

While the steering shaft 27 has been shown as formed of three connected shafts 26, 28 and 29, it will be appreciated that a single shaft may be used in some vehicles. In such cases, flexing of the shaft will allow the necessary lateral movement of the shaft to actuate the control element for the steering motor.

It will also be appreciated that an electric control element and an electric motor can be used in place of the valve 52 and fluid actuated steering motor 53, and that other modifications and changes can also be made in the particular embodiment of the invention as shown and described without departing from the spirit and scope of the invention.

I now claim:

1. In a vehicle, a power steering motor operatively connected to a wheel to be steered whereby said wheel may be steered by operation of said motor, an elongated steering shaft, means mounting one end of said steering shaft for rotary movement while preventing bodily movement of said one end, means operatively connecting said one end of said steering shaft to said wheel whereby said wheel may also be steered by rotation of said shaft, a pivotally mounted arm, means mounting the other end of said shaft on said arm for rotary movement relatively to said arm and bodily movement with said arm, a gear secured to said other end of said shaft, a pinion meshing with said gear, means mounting said pinion on the same pivotal axis as said arm, means for rotating said pinion to apply torque through said gear to said other end of said shaft tending to rotate said shaft whereby said other end of said shaft is first moved bodily with said arm, and means actuated by bodily movement of said other end of said shaft and said arm to effect operation of said power steering motor to steer said wheel.

2. In a vehicle, a power steering motor operatively connected to a wheel to be steered whereby said wheel may be steered by operation of said motor, an elongated steering shaft, means mounting one end of said steering shaft for rotary movement while preventing bodily movement of said one end, means operatively connecting said one end of said steering shaft to said wheel whereby said wheel may also be steered by rotation of said shaft, a pivotally mounted arm, means mounting the other end of said shaft on said arm for rotary movement relatively to said arm and bodily movement with said arm, a gear secured to said other end of said shaft, a pinion meshing with said gear, means mounting said pinion on the same pivotal axis as said arm, a steering wheel for rotating said pinion to apply torque through said gear to said other end of said shaft tending to rotate said shaft whereby said other end of said shaft is first moved bodily with said arm, and means actuated by bodily movement of said other end of said shaft and said arm to effect operation of said power steering motor to steer said wheel.

3. In an industrial truck, a power steering motor operatively connected to a wheel to be steered whereby said wheel may be steered by operation of said motor, an elongated steering shaft, means mounting one end of said steering shaft for rotary movement while preventing bodily movement of said one end, a first set of reduction gears connecting said one end of said shaft to said wheel whereby said wheel may also be steered by rotation of said shaft, a pivotally mounted arm, means mounting the other end of said shaft on said arm for rotary movement relative to said arm and bodily movement with said arm, a steering wheel, a second set of reduction gears connecting said steering wheel to said other end of said shaft so that torque may be applied to said shaft by said steering wheel tending to rotate said shaft whereby said other end of said shaft is first moved bodily with said arm, and means actuated by bodily movement of said other end of said shaft and said arm to effect operation of said power steering motor.

4. In an industrial truck, a power steering motor operatively connected to a wheel to be steered whereby said wheel may be steered by operation of said motor, an elongated steering shaft, means mounting one end of said steering shaft for rotary movement while preventing bodily movement of said one end, a first set of reduction gears connecting said one end of said shaft to said wheel whereby said wheel may also be steered by rotation of said shaft, a pivotally mounted arm, means mounting the other end of said shaft on said arm for rotary movement relative to said arm and bodily movement with said arm, a gear secured to said other end of said shaft, a pinion meshing with said gear, means mounting said pinion on the same pivotal axis as said arm, a steering wheel for rotating said pinion to apply torque through said gear to said shaft tending to rotate said shaft whereby said other end of said shaft is first moved bodily with said arm, and means actuated by bodily movement of said other end of said shaft and said arm to effect operation of said power steering motor.

5. In an industrial truck, a wheel to be steered, a gear secured to said wheel, a power steering motor operatively connected to said gear means for effecting steering movement of said wheel, an elongated steering shaft, means mounting one end of said steering shaft for rotary movement while preventing bodily movement of said one end, a pinion secured to said one end of said steering shaft and meshing with said gear secured to said wheel whereby said wheel may also be steered by rotation of said shaft, means mounting the other end of said steering shaft for bodily movement, a gear secured to the other end of said shaft, a pinion meshing with said gear secured to said other end of said shaft, a steering wheel for rotating said pinion to apply torque through said gear to said shaft tending to rotate said shaft whereby said other end of said shaft is first moved bodily with said arm, and means actuated by bodily movement of said other end of said shaft and said arm to effect operation of said power steering motor to steer said wheel.

References Cited in the file of this patent
UNITED STATES PATENTS

| | | |
|---|---|---|
| 2,508,057 | Bishop | May 16, 1950 |
| 2,650,669 | Hammond | Sept. 1, 1953 |
| 2,757,643 | Hunter | Aug. 7, 1956 |
| 2,826,257 | Metcalf | Mar. 11, 1958 |